(12) United States Patent
Matsushima et al.

(10) Patent No.: US 9,910,323 B2
(45) Date of Patent: Mar. 6, 2018

(54) LIQUID CRYSTAL DISPLAY DEVICE

(71) Applicant: Japan Display Inc., Tokyo (JP)

(72) Inventors: Toshiharu Matsushima, Tokyo (JP); Daichi Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/291,030

(22) Filed: Oct. 11, 2016

(65) Prior Publication Data

US 2017/0115535 A1    Apr. 27, 2017

(30) Foreign Application Priority Data

Oct. 22, 2015    (JP) .................................. 2015-208344

(51) Int. Cl.
*G02F 1/1343* (2006.01)
*G02F 1/1337* (2006.01)
*G02F 1/1333* (2006.01)

(52) U.S. Cl.
CPC ...... *G02F 1/134309* (2013.01); *G02F 1/1337* (2013.01); *G02F 1/133345* (2013.01); *G02F 1/133707* (2013.01); *G02F 2001/133742* (2013.01); *G02F 2001/134345* (2013.01); *G02F 2001/134372* (2013.01); *G02F 2201/121* (2013.01); *G02F 2201/123* (2013.01)

(58) Field of Classification Search
CPC ............ G02F 1/133345; G02F 1/1337; G02F 2001/134372; G02F 2201/123; G02F 2001/133742; G02F 2001/134345; G02F 2201/121

See application file for complete search history.

(56) References Cited

U.S. PATENT DOCUMENTS

| | | | |
|---|---|---|---|
| 9,298,051 B2 | 3/2016 | Matsushima | |
| 9,377,658 B2 | 6/2016 | Tamaki et al. | |
| 9,383,614 B2 | 7/2016 | Matsushima | |
| 2005/0280763 A1* | 12/2005 | Kang | G02F 1/134363 349/141 |
| 2009/0128726 A1* | 5/2009 | Tanno | G02F 1/134363 349/43 |
| 2014/0132906 A1* | 5/2014 | Yoshioka | G02F 1/134309 349/141 |
| 2014/0293177 A1 | 10/2014 | Matsushima | |

(Continued)

FOREIGN PATENT DOCUMENTS

JP    2014-209212 A    11/2014

*Primary Examiner* — Dennis Y Kim

(74) *Attorney, Agent, or Firm* — Michael Best & Friedrich LLP

(57) ABSTRACT

A liquid crystal display device according to an aspect of the present invention includes a first substrate including a pixel electrode and a common electrode, a second substrate opposed to the first substrate, and a liquid crystal layer disposed between the first substrate and the second substrate. The pixel or common electrode includes, in a single subpixel, belt-like portions arranged in a first direction, and coupling portions coupling the adjacent belt-like portions. Each belt-like portion continuously extends from one side to an other side of a central line of the subpixel, that is parallel with the first direction. The coupling portions include one or more first coupling portions provided on the one side of the central line, and one or more second coupling portions provided on the other side of the central line.

14 Claims, 10 Drawing Sheets

(56) References Cited

U.S. PATENT DOCUMENTS

| | | |
|---|---|---|
| 2014/0354931 A1 | 12/2014 | Kurasawa et al. |
| 2016/0026043 A1 | 1/2016 | Okazaki et al. |
| 2016/0062158 A1 | 3/2016 | Matsushima |
| 2016/0062191 A1 | 3/2016 | Matsushima |

* cited by examiner

LIQUID CRYSTAL DISPLAY DEVICE

CROSS-REFERENCE TO RELATED APPLICATIONS

This application claims priority from Japanese Application No. 2015-208344, filed on Oct. 22, 2015, the contents of which are incorporated by reference herein in its entirety.

BACKGROUND

1. Technical Field

The present disclosure relates to a liquid crystal display device.

2. Description of the Related Art

A liquid crystal display device disclosed in Japanese Patent Application Laid-open Publication No. 2014-209212 (JP-A-2014-209212) is known as a liquid crystal display device of a transverse electric field type in which pixel electrodes and a common electrode are provided on the same substrate. The liquid crystal display device disclosed in JP-A-2014-209212 is a liquid crystal display device in which a plurality of slits are formed in the common electrode, and the common electrode is disposed on a liquid crystal layer side of the pixel electrodes.

In the liquid crystal display device disclosed in JP-A-2014-209212, adjacent slits communicate with each other through a communicating portion. With the structure, when a voltage is applied between the pixel electrode and the common electrode, liquid molecules in the vicinity of two sides opposite to each other in the same slit are rotated in directions opposite to each other. This structure achieves high-speed response. However, because this structure forms a region in which orientation of liquid crystal molecules hardly changes, in the central portions of the slits and in a position on an electrode disposed between slits, display may be darkened.

SUMMARY

A liquid crystal display device according to an aspect of the present invention includes: a first substrate including a pixel electrode and a common electrode; a second substrate disposed opposite to the first substrate; and a liquid crystal layer disposed between the first substrate and the second substrate. The pixel electrode or the common electrode includes, in a single subpixel, a plurality of belt-like portions arranged in a first direction, and a plurality of coupling portions that are configured to couple adjacent belt-like portions of the plurality of belt-like portions. Each of the plurality of belt-like portions continuously extends from one side to an other side of a central line of the single subpixel. The central line is parallel with the first direction and disposed between the one side and the other side. The plurality of coupling portions include one or more first coupling portions provided on the one side of the central line and one or more second coupling portions provided on the other side of the central line.

DETAILED DESCRIPTION

Figure 1:
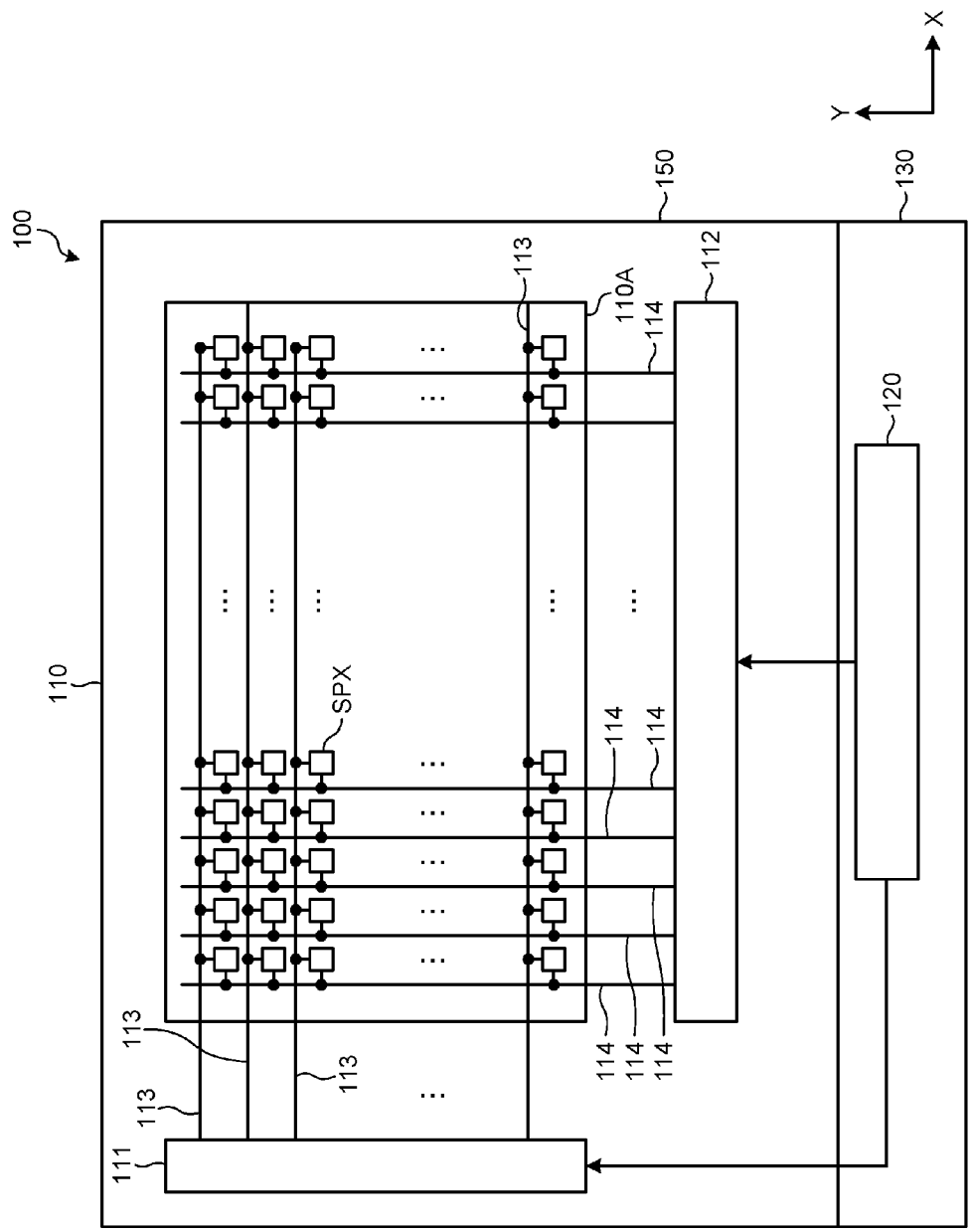
FIG. 1 is a block diagram illustrating a liquid crystal display device according to a first embodiment.

Modes (embodiments) for carrying out the invention will be explained hereinafter in detail with reference to drawings. The present invention is not limited by the details described in the following embodiments. In addition, the constituent elements described hereinafter include elements that the skilled person could easily think of, and substantially the same elements. The constituent elements described hereinafter can be properly combined. The disclosure is a mere example, and the scope of the present invention includes proper modifications that the skilled person could easily think of with the gist of the invention maintained, as a matter of course. The drawings may more schematically illustrate the widths, thicknesses, and shapes of the members than the actual mode to further clarify the explanation, but provide a mere example, and do not limit the interpretation of the present invention. In the specification and the drawings, like elements as those illustrated in the foregoing drawings may be denoted by like reference numerals, and detailed explanation thereof may be properly omitted.

First Embodiment

FIG. 1 is a block diagram illustrating a liquid crystal display device 100 according to a first embodiment. In the following explanation, an XYZ coordinate system is used to explain the positional relation of the members and the like.

The liquid crystal display device 100 includes a liquid crystal panel 110 and a drive IC 120. The liquid crystal panel 110 includes a first substrate 130 and a second substrate 150 that are disposed opposite to each other with a liquid crystal layer interposed therebetween. The first substrate 130 is formed larger than the second substrate 150, and a portion of the first substrate 130 projecting outside the second substrate 150 serves as a terminal portion. The drive IC 120 is provided in the terminal portion.

A display region 110A is provided in a central portion of a opposite region in which the first substrate 130 is opposite to the second substrate 150. The display region 110A is provided with a plurality of gate lines 113 extending in an X direction and a plurality of source lines 114 extending in a Y direction such that the gate lines 113 and the source lines 114 cross each other. The gate lines 113 are arranged side by side in the Y direction, and the source lines 114 are arranged side by side in the X direction.

Subpixels SPX are provided to correspond to respective crossing portions between the gate lines 113 and the source lines 114. The subpixels SPX are arranged along the extending direction of the gate lines 113 and the extending direction of the source lines 114 and side by side in the X direction and the Y direction. The display region 110A is formed by arranging the subpixels SPX in the X direction and the Y direction. The shape of the display region 110A is, for example, a rectangular shape, but the shape of the display region 110A is not limited to a rectangular shape. For example, the display region 110A may have any shape other than a rectangular shape, such as a polygonal shape, a circular shape, and an oval shape.

A gate driver 111 and a source driver 112 are provided in a peripheral portion of the opposite region. The gate driver 111 is provided along a first side of the display region 110A. The source driver 112 is provided along a second side of the display region 110A. Each of the gate lines 113 is electrically coupled with the gate driver 111. Each of the source lines 114 is electrically coupled with the source driver 112. The gate driver 111 and the source driver 112 are electrically coupled with the drive IC 120. The gate driver 111 and the source driver 112 are, for example, provided separately along two sides of the display region 110A that are mutually orthogonal, but arrangement of the gate driver 111 and the source driver 112 is not limited thereto. For example, the gate driver 111 and the source driver 112 may be provided along the same side of the display region 110A.

Figure 2:
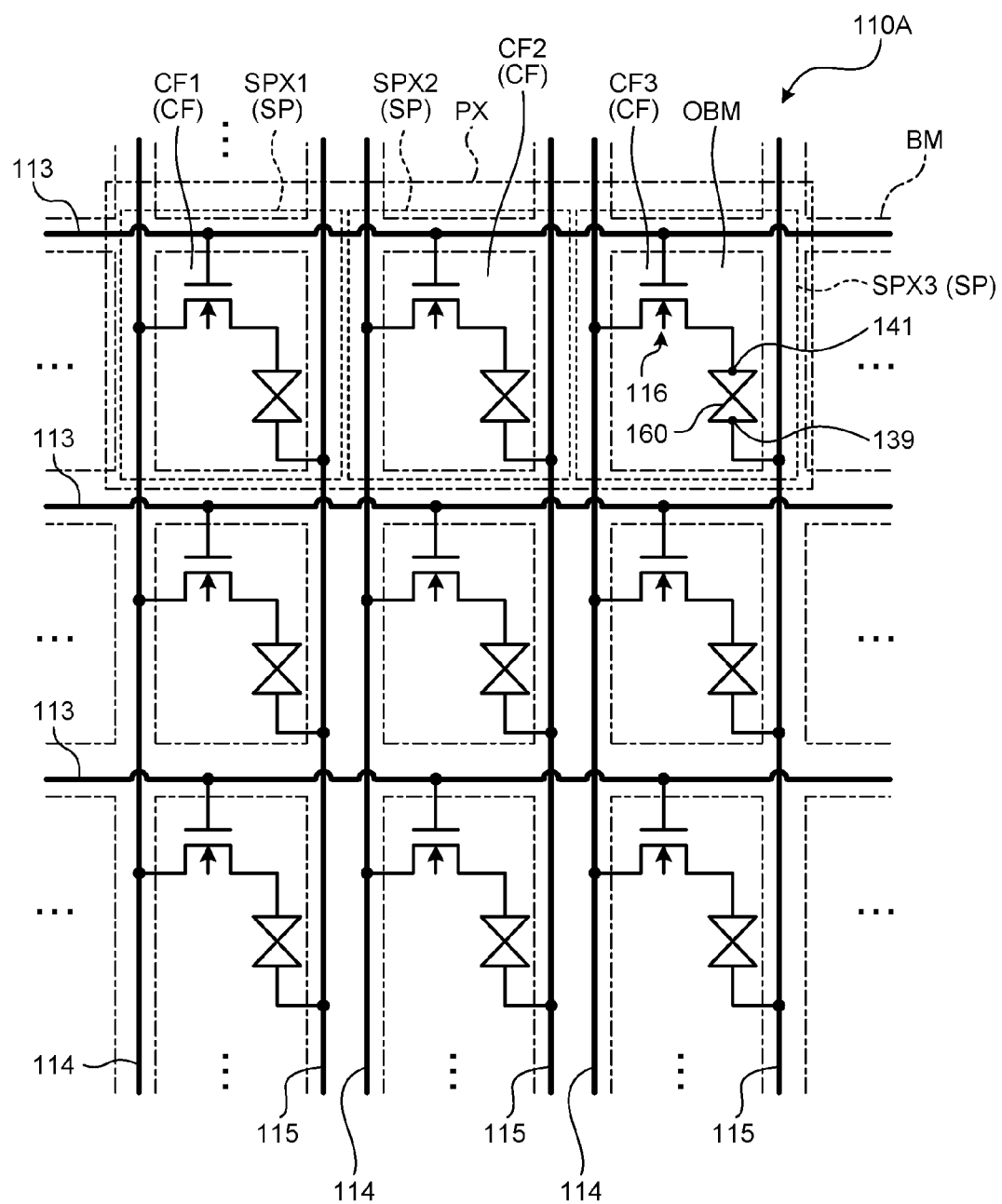
FIG. 2 is an equivalent circuit schematic of a display region.

FIG. 2 is an equivalent circuit schematic of the display region 110A.

The subpixels SPX are provided with respective pixel electrodes 141. Each of the pixel electrodes 141 is electrically coupled with a thin-film transistor 116. A source of a thin-film transistor 116 is electrically coupled with a source line 114. An image signal is supplied to each of the subpixels SPX through the source lines 114. An image signal may be supplied to the source lines 114 in a line sequential manner. As another example, adjacent source lines 114 may be grouped, and an image signal may be supplied to each of the groups.

A gate of a thin-film transistor 116 is electrically coupled with a gate line 113. A gate signal is supplied to the gate lines 113 in a line sequential manner. Each pixel electrode 141 is electrically coupled with a drain of a thin-film transistor 116. A common electrode 139 is electrically coupled with common lines 115. When a thin-film transistor 116 is turned on for a certain period by input of a gate signal, an image signal supplied from the source line 114 is written to the pixel electrode 141. The image signal written to the pixel electrode 141 is held for a certain period between the pixel electrode 141 and the common electrode 139. A liquid crystal layer 160 has orientation changing according to an electric field generated between the pixel electrode 141 and the common electrode 139. In this manner, light made incident on the liquid crystal layer 160 is modulated to perform gradation display.

The display region 110A is provided with a plurality of types of subpixels SPX displaying mutually different colors. The color displayed by one subpixel SPX is determined according to the color of a color filter CF thereof. For example, the example of FIG. 2 has a structure in which a first subpixel SPX1 including a color filter CF1 of a first color, a second subpixel SPX2 including a color filter CF2 of a second color, and a third subpixel SPX3 including a color filter CF3 of a third color are provided to be mutually adjacent. One subpixel SPX is a region (region surrounded by a black matrix BM) in which display is performed by one pixel electrode 141 and the common electrode 139. One pixel PX is formed of a plurality of types of adjacent pixels SPX (the first subpixel SPX1, the second subpixel SPX2, and the third subpixel SPX3). Full-color display is performed by controlling gradation of each of the subpixels SPX of a plurality of types provided in each pixel PX. In the display region 110A, a plurality of pixels PX are arranged side by side in the X direction and the Y direction.

Figure 3:
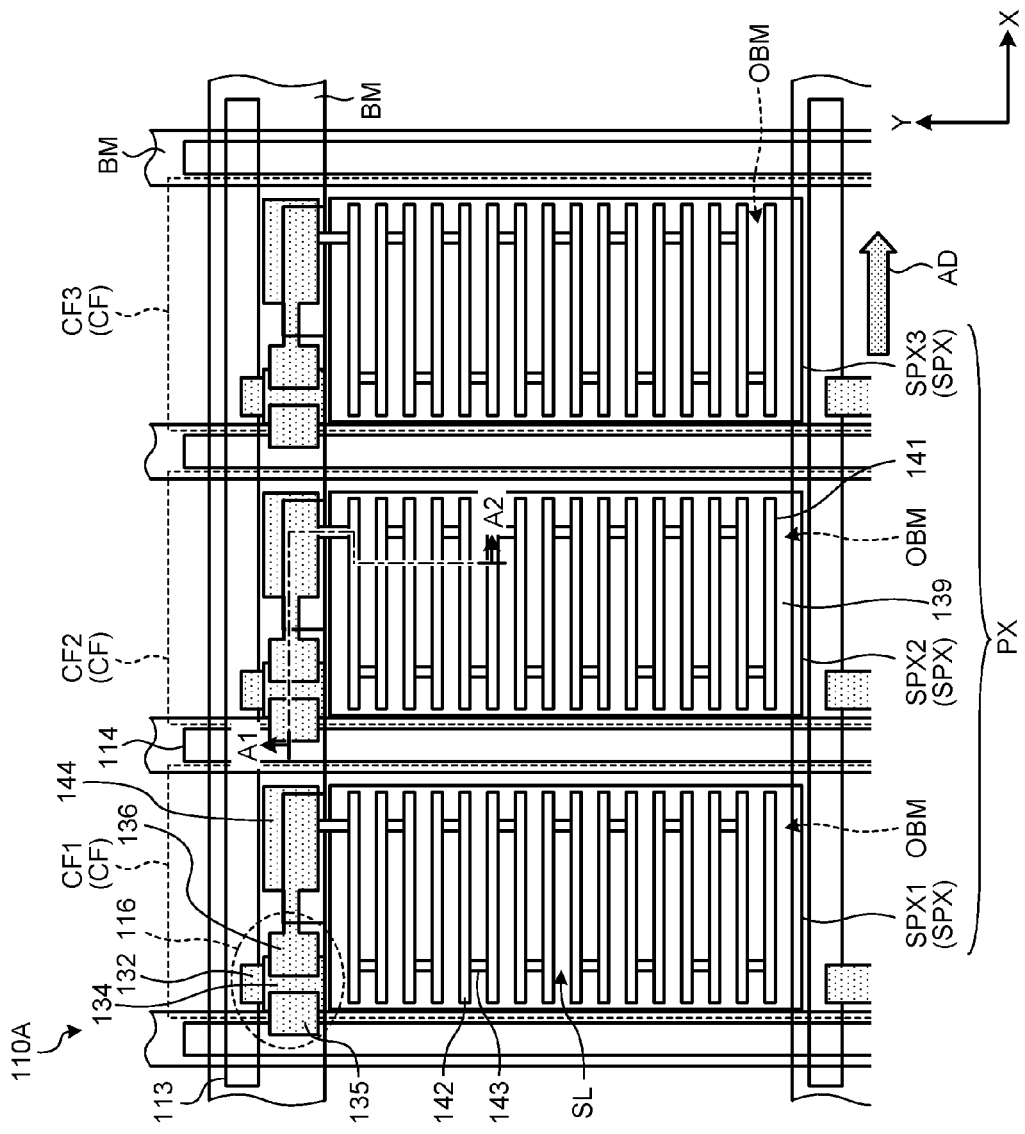
FIG. 3 is a plan view of a pixel as viewed from a normal direction of a first substrate.
Figure 4:
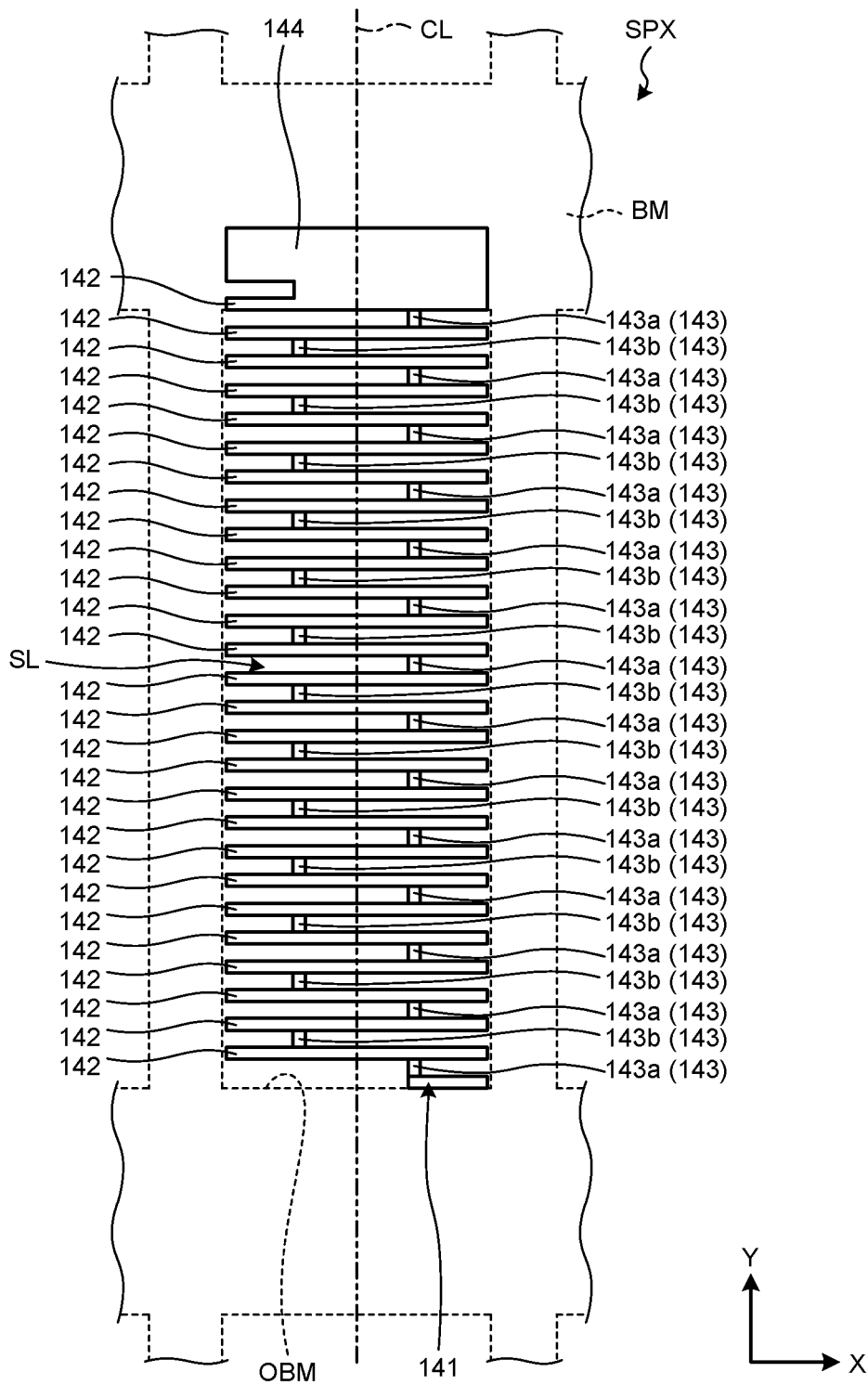
FIG. 4 is a plan view illustrating an electrode structure of a subpixel.

FIG. 3 is a plan view of a pixel PX as viewed from a normal direction (Z direction) of the first substrate 130. FIG. 4 is a plan view illustrating an electrode structure of a subpixel SPX.

As illustrated in FIG. 3, each of three subpixels SPX forming a pixel PX is provided with a pixel electrode 141 and the common electrode 139. The common electrode 139 is partly superimposed on the pixel electrode 141 with an insulating film interposed therebetween. The pixel electrode 141 or the common electrode 139 includes, in one subpixel SPX, a plurality of belt-like portions 142 arranged in the Y direction (first direction), and a plurality of coupling portions 143 coupling the adjacent belt-like portions 142.

In the present embodiment, for example, the pixel electrode 141 is disposed on the liquid crystal layer side of the common electrode 139 with the insulating film interposed between the pixel electrode and the common electrode, and the pixel electrode 141 is provided with the plurality of belt-like portions 142 and the plurality of coupling portions 143. The belt-like portions 142 and the coupling portions 143 are formed by providing a plurality of slits SL in the pixel electrode 141. Two adjacent belt-like portions 142 are opposite to each other with a slit SL interposed therebetween. For example, only one coupling portion 143 is disposed between two adjacent belt-like portions 142, and the two belt-like portions 142 are electrically and mechanically coupled with the coupling portion 143.

As illustrated in FIG. 4, each of the plurality of belt-like portions 142 extends continuously from one side (for example, +X side) to an other side (for example, −X side) of a central line CL of the subpixel SPX. The central line CL is parallel with the Y direction (first direction), and is disposed between the sides. The plurality of coupling portions 143 include one or more first coupling portions 143a provided on one side of the central line CL and one or more second coupling portions 143b provided on the other side of the central line CL.

In the present embodiment, for example, the first coupling portions 143a and the second coupling portions 143b are alternately arranged repeatedly in the Y direction (first direction). Among the belt-like portions 142 provided in one subpixel SPX, at least some belt-like portions 142 (for example, a plurality of belt-like portions 142 other than one or a plurality of belt-like portions 142 provided in end portions) provided in the central portion has a length equal to each other. The belt-like portions 142 provided in the central portion are arranged side by side in the Y direction at uniform pitch.

Each pixel electrode 141 has a widened portion 144 having a larger width in the Y direction than that of the belt-like portions 142, on one end side (for example, +Y side) in the arrangement direction of the belt-like portions 142. The widened portion 144 is electrically coupled with the belt-like portion 142 that is disposed closest to the end. A black matrix BM is provided around each pixel electrode 141. The black matrix BM is a light shield layer having an opening portion OBM in a position opposite to the central portion of the pixel electrode 141. The region provided with the opening portion OBM serves as the subpixel SPX. The black matrix BM is disposed to be superimposed on part or whole of the widened portion 144. The belt-like portions 142 and the coupling portions 143 are disposed in the opening portion OBM.

The common electrode 139 is provided in a position in which the common electrode 139 is superimposed on at least a space between the adjacent belt-like portions 142. The common electrode 139 is, for example, formed on the whole surface of the display region, but the shape of the common electrode 139 is not limited thereto. For example, the common electrode 139 may be divided into a plurality of portions in the display region, and the divided individual portions may be electrically coupled with the common lines 115 (see FIG. 2).

With reference to FIG. 3 again, the display region 110A is provided with the gate lines 113 extending in the X direction and the source lines 114 extending in the Y direction along spaces between the pixel electrodes 141. The thin-film transistors 116 are provided in the vicinity of the respective crossing portions between the gate lines 113 and the source lines 114. Each thin-film transistor 116 includes a gate electrode 132, a semiconductor layer 134, a source electrode 135, and a drain electrode 136.

The gate electrode 132 is provided to branch from the gate line 113 in the Y direction. The semiconductor layer 134 is provided to be superimposed on the gate electrode 132. The source electrode 135 is provided to branch from the source line 114 in the X direction, and includes an end portion on the +X side electrically coupled with the source portion of the semiconductor layer 134. The drain electrode 136 is provided opposite to the source electrode 135 in the X direction with a channel portion of the semiconductor layer 134 interposed therebetween. The widened portion 144 of the pixel electrode 141 is provided along the gate line 113, and includes an end portion on the −X side electrically coupled with the drain electrode 136.

Figure 5:
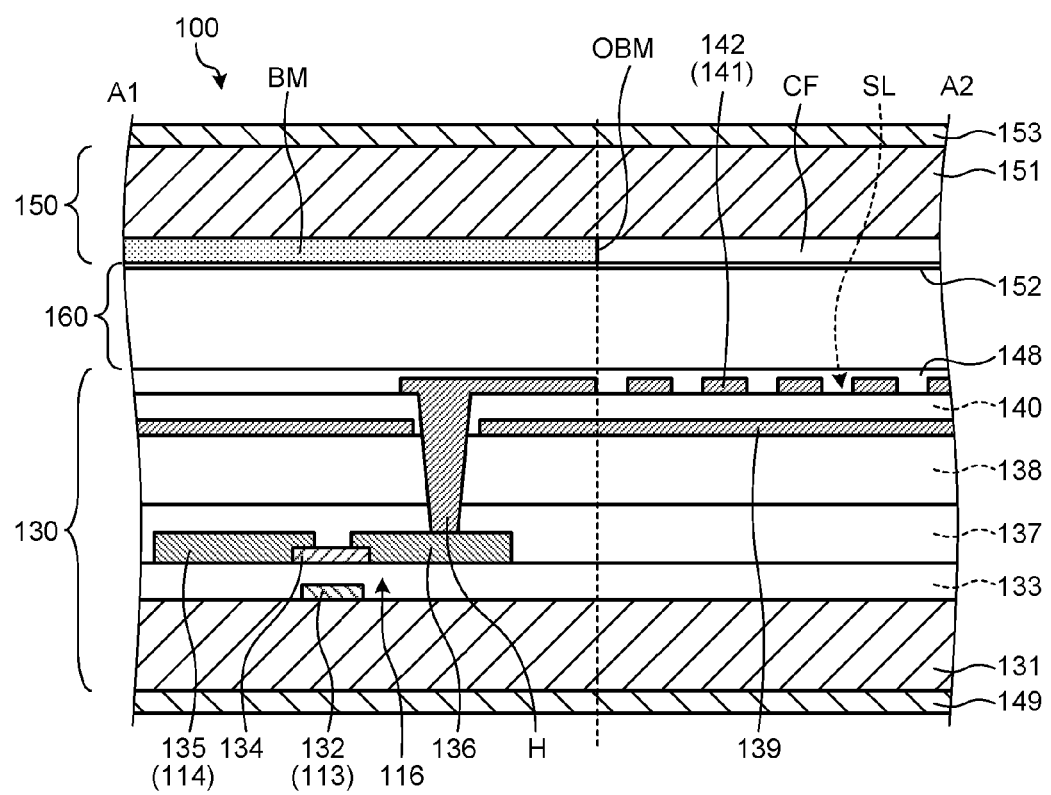
FIG. 5 is a cross-sectional view taken along line A1-A2 in FIG. 3.

FIG. 5 is a cross-sectional view taken along line A1-A2 of FIG. 3.

The liquid crystal display device 100 includes the first substrate 130 including the pixel electrodes 141 and the common electrode 139, the second substrate 150 disposed opposite to the first substrate 130, and the liquid crystal layer 160 disposed between the first substrate 130 and the second substrate 150.

The first substrate 130 includes a first base material 131 formed of a translucent insulating member such as glass. The gate lines 113 and the gate electrode 132 are formed on the internal surface side (liquid crystal layer 160 side) of the first base material 131. A gate insulating film 133 formed of a translucent insulating member such as silicon oxide is formed on the first base material 131, to cover the gate lines 113 and the gate electrode 132. The semiconductor layer 134 formed of amorphous silicon, low-temperature polycrystalline silicon (LTPS), or a semiconductor oxide is formed on the gate insulating film 133. The source electrode 135 and the drain electrode 136 are formed on the gate insulating film 133, to be partly placed on the semiconductor layer 134.

A first interlayer insulating film 137 formed of a translucent insulating member such as silicon oxide is formed on the gate insulating film 133, to cover the semiconductor layer 134, the source electrode 135, and the drain electrode 136. A second interlayer insulating film 138 formed of a translucent insulating member such as acrylic resin is formed on the first interlayer insulating film 137. The common electrode 139 formed of a translucent conductive member such as indium tin oxide (ITO) is formed on the second interlayer insulating film 138. A capacitive insulating film 140 formed of a translucent insulating member such as silicon nitride is formed on the second interlayer insulating film 138, to cover the common electrode 139.

The pixel electrodes 141 formed of a translucent conductive member such as ITO are formed on the capacitive insulating film 140. Each pixel electrode 141 is electrically coupled with the drain electrode 136 via a contact hole H extending through the capacitive insulating film 140, the second interlayer insulating film 138, and the first interlayer insulating film 137. The common electrode 139 is provided with an opening portion corresponding to the formation region of the contact hole H and slightly larger than the contact hole H. The opening portion provided in the common electrode 139 prevents the common electrode 139 from contacting each pixel electrode 141. A first orientation film 148 formed of polyimide or the like is formed on the capacitive insulating film 140, to cover the pixel electrodes 141.

The second substrate 150 includes a second base material 151 formed of a translucent insulating member such as glass. The color filters CF and the black matrix BM are formed on an internal surface side (liquid crystal layer 160 side) of the second base material 151. Each color filter CF is formed in a region (opening portion OBM) surrounded by the black matrix BM. A second orientation film 152 formed of polyimide or the like is formed on the color filters CF and the black matrix BM.

A first polarizing plate 149 is bonded to an external surface side (side reverse to the liquid crystal layer 160) of the first base material 131. A second polarizing plate 153 is bonded to an external surface side (side reverse to the liquid crystal layer 160) of the second base material 151. A transmission axis of the first polarizing plate 149 is, for example, parallel with the Y direction. A transmission axis of the second polarizing plate 153 is, for example, orthogonal to the transmission axis of the first polarizing plate 149. The first orientation film 148 and the second orientation film 152 have been subjected to orientation treatment by rubbing or ultraviolet irradiation or the like. Supposing that the direction in which orientation treatment is performed is an orientation treatment direction AD (see FIG. 3), the orientation treatment direction AD of the first orientation film 148 is, for example, parallel with the X direction (second direction). The orientation treatment direction of the second orientation film 152 is, for example, parallel with the orientation treatment direction AD of the first orientation film 148. The first orientation film 148 and the second orientation film 152 orient the liquid crystal layer 160 in the X direction.

The liquid crystal layer 160 includes liquid crystal molecules having positive dielectric anisotropy. The X direction (second direction orthogonal to the first direction) is the orientation direction of the liquid crystal molecules in an initial orientation state in which no voltage is applied between the pixel electrode 141 and the common electrode 139. When a voltage is applied between the pixel electrode 141 and the common electrode 139, the liquid crystal molecules are oriented in the Y direction with an electric field formed between the pixel electrode 141 and the common electrode 139. In the liquid crystal display device 100, light and dark display is performed using birefringence based on difference in orientation state between the liquid crystal molecules as described above.

Figure 6:
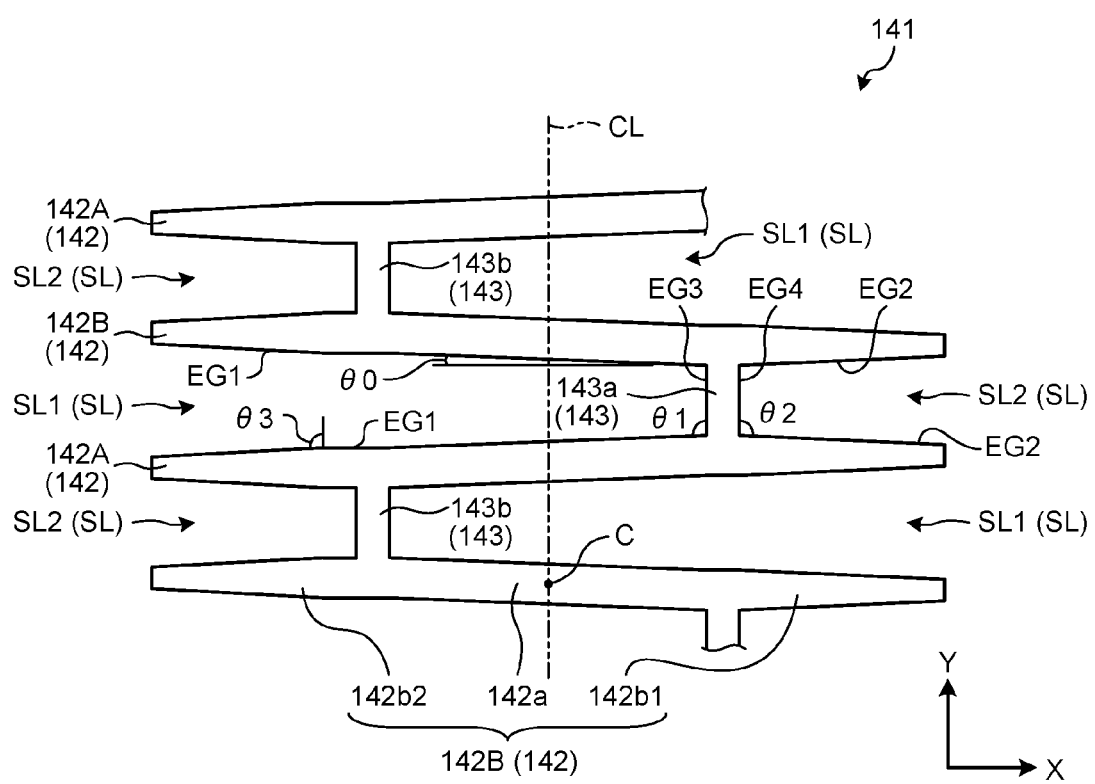
FIG. 6 is an enlarged plan view of a part of the electrode structure illustrated in FIG. 5.

The following is specific explanation of the structure of the pixel electrode 141 and movement of the liquid crystal molecules when a voltage is applied. FIG. 6 is an enlarged plan view of part of the electrode structure illustrated in FIG. 5.

Each of the belt-like portions 142 includes a main line portion 142a extending from one side (for example, +X side) to the other side (for example, −X side) of the central line CL of the subpixel over the central line CL, a first extension portion 142b1 provided on one end side of the main line portion 142a, and a second extension portion 142b2 provided on the other end side of the main line portion 142a. Each of the belt-like portions 142 has a rotation-symmetrical shape with respect to, for example, the center C of the belt-like portion 142.

The main line portion 142a has a shape, for example, having a fixed width in the Y direction. In the present embodiment, the main line portion 142a has a parallelogram shape in which at least a portion (for example, a portion disposed between the first coupling portion 143a and the second coupling portion 143b) other than the longitudinal both end portions is inclined with respect to the X direction, but the shape of the main line portion is not limited thereto. For example, the main line portion 142a may have a rectangular shape in which at least the portion other than the longitudinal both end portions is parallel with the X direction.

Each of the first extension portion 142b1 and the second extension portion 142b2 has, for example, a shape in which the width in the Y direction is smaller in a position distant from the main line portion 142a. In each of the first extension portion 142b1 and the second extension portion 142b2, two edges opposite to each other in the Y direction are inclined in a direction approaching each other. In the present embodiment, each of the first extension portion 142b1 and the second extension portion 142b2 has a trapezoidal shape in which at least a portion (for example, a portion disposed opposite to the central line CL side of the coupling portion 143) other than an end portion on the main line portion 142a side is inclined with respect to the X direction, but the shape of the first extension portion 142b1 and the second extension portion 142b2 is not limited thereto. For example, the first extension portion 142b1 and the second extension portion 142b2 may have a shape in which at least the portion other than the end portion on the main line portion 142a side has a triangular shape.

The belt-like portions 142 include first belt-like portions 142A and second belt-like portions 142B that are mutually different in inclined direction of the main line portion 142a. The main line portion 142a of each of the first belt-like portions 142A is inclined by an angle θ0 (0<θ0<45°) counterclockwise with respect to the X direction. The main line portion 142a of each of the second belt-like portions 142B is inclined by an angle θ0 clockwise with respect to the X direction. The first belt-like portions 142A and the second belt-like portions 142B have line-symmetrical shapes with respect to a line parallel with the X direction, for example.

The first belt-like portions 142A and the second belt-like portions 142B are alternately arranged repeatedly in the Y direction, for example. A space (space between edges opposite to each other in the Y direction) between two adjacent belt-like portions 142 varies along the X direction. Two adjacent belt-like portions 142 are coupled with the coupling portion 143 at a portion at which the space therebetween is smallest. In the example of FIG. 6, the coupling portion 143 is coupled to end portions of two main line portions 142a approaching each other. The first coupling portions 143a are disposed in a straight-line manner along the Y direction, and the second coupling portions 143b are arranged in a straight-line manner along the Y direction. The space between two adjacent belt-like portions 142 increases as the distance thereof from the coupling portion 143 increases.

Each slit SL provided between two adjacent belt-like portions 142 is divided by a corresponding coupling portion 143 of the plurality of coupling portions 143 into a first slit portion SL1 disposed closer to the central line CL than the corresponding coupling portion 143 and a second slit portion SL2 disposed further away from the central line CL than the corresponding coupling portion 143. An edge of each belt-like portion 142 facing the slit SL includes a first edge portion EG1 facing the first slit portion SL1 and a second edge portion EG2 facing the second slit portion SL2. Each of the plurality of coupling portions 143 includes a third edge portion EG3 facing the first slit portion SL1 and a fourth edge portion EG4 facing the second slit portion SL2.

An angle θ1 at which the first edge portion EG1 and the third edge portion EG3 cross is an obtuse angle. An angle θ2 at which the second edge portion EG2 and the fourth edge portion EG4 cross is an obtuse angle. The angle θ2 (a first angle) between the second edge portion EG2 and the fourth edge portion EG4 is larger than the angle θ1 (a second angle) between the first edge portion EG1 and the third edge portion EG3. In two adjacent belt-like portions 142, the space between the first edge portions EG1 and the space between the second edges EG2 increase as the distance thereof from the coupling portion 143 increases. This structure enables easy stabilization of orientation of the liquid crystal molecules in the first slit portion SL1 and the second slit portion SL2.

Each first edge portion EG1 includes a plurality of portions with mutually different inclination angles with respect to the third edge portion EG3. The inclination angle (a first inclination angle) of a portion (a second portion) provided in a position distant from the corresponding coupling portion 143 is larger than the inclination angle (a second inclination angle) of a portion (a first portion) provided in a position close to the corresponding coupling portion 143. A position of the first portion is farther from the corresponding coupling portion 143 than a position of the second portion. For example, in the first edge portion EG1, an inclination angle θ3 of a portion corresponding to the edge of the first extension portion 142b1 or the second extension portion 142b2 is larger than the inclination angle θ1 of a portion corresponding to the edge of the main line portion 142a. This structure enables easy stabilization of orientation of the liquid crystal molecules in a position distant from the coupling portion 143.

Figure 7:
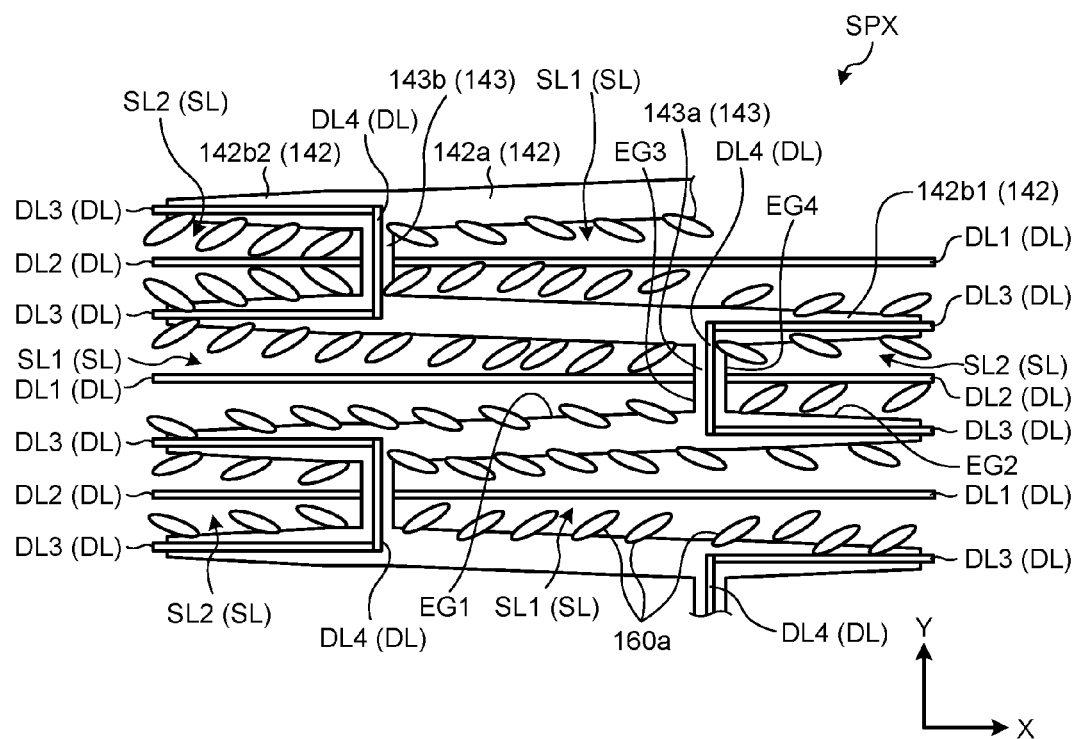
FIG. 7 is a diagram illustrating an orientation state of liquid molecules when a voltage is applied.

FIG. 7 is a diagram illustrating an orientation state of liquid crystal molecules 160a when a voltage is applied.

When a voltage is applied between the pixel electrode 141 and the common electrode 139 (see FIG. 5), the liquid crystal molecules 160a in the vicinity of the edges opposite to each other of two adjacent belt-like portions 142 are rotated in mutually opposite directions with respect to the normal direction of the first substrate 130 (see FIG. 5). The liquid crystal molecules 160a (first liquid crystal molecules) in the vicinity of the first edge portion EG1 and the liquid crystal molecules 160a (second liquid crystal molecules) in the vicinity of the second edge portion EG2 that are adjacent in the X direction (second direction orthogonal to the first direction) with the corresponding coupling portion 143 interposed between the first edge portion EG1 and the second edge portion EG2 are rotated in mutually opposite directions with respect to the normal direction of the first substrate 130 (see FIG. 5). This structure achieves high-speed response.

In the operation, a plurality of line-shaped regions DL are formed in each subpixel SPX. In the line-shaped regions DL, orientation of the liquid crystal molecules 160a hardly changes, even when a voltage is applied between the pixel electrode 141 and the common electrode 139 (see FIG. 5). Specifically, a first line-shaped region DL1 extending in the X direction and running through the center of the first slit portion SL1 is formed in a position superimposed on the first slit portion SL1. A second line-shaped region DL2 extending in the X direction and running through the center of the second slit portion SL2 is formed in a position superimposed on the second slit portion SL2. A third line-shaped region DL3 is formed in a position of a portion of the belt-like portion 142 adjacent to the second slit portion SL2 in the Y direction. A fourth line-shaped region DL4 is formed in the position of the coupling portion 143. The first line-shaped region DL1 and the second line-shaped region DL2 are line-shaped regions in which change in orientation of the liquid crystal molecules 160a is limited by interference between the liquid crystal molecules 160a. The third line-shaped region DL3 and the fourth line-shaped region DL4 are line-shaped regions in which an electric field does not sufficiently act on the liquid crystal molecules 160a and thereby orientation of the liquid crystal molecules 160a does not easily change.

Display becomes dark in a portion in which a line-shaped region DL is formed. However, no line-shaped regions DL are formed in a portion (central portion of the belt-like portion 142) of the belt-like portion 142 disposed between the first coupling portion 143a and the second coupling portion 143b. In the central portion of each belt-like portion 142, because the liquid crystal molecules 160a in the vicinity of the edge on the −Y side and the liquid crystal molecules 160a in the vicinity of the edge on the +Y side are rotated in the same direction as viewed from the normal direction of the first substrate 130 (see FIG. 5), orientation of the liquid crystal molecules 160a provided in a position superimposed on the belt-like portion 142 can be sufficiently changed. With the structure, display is brightened in comparison with the case where the line-shaped regions DL are formed in the whole belt-like portion 142.

Figure 8:
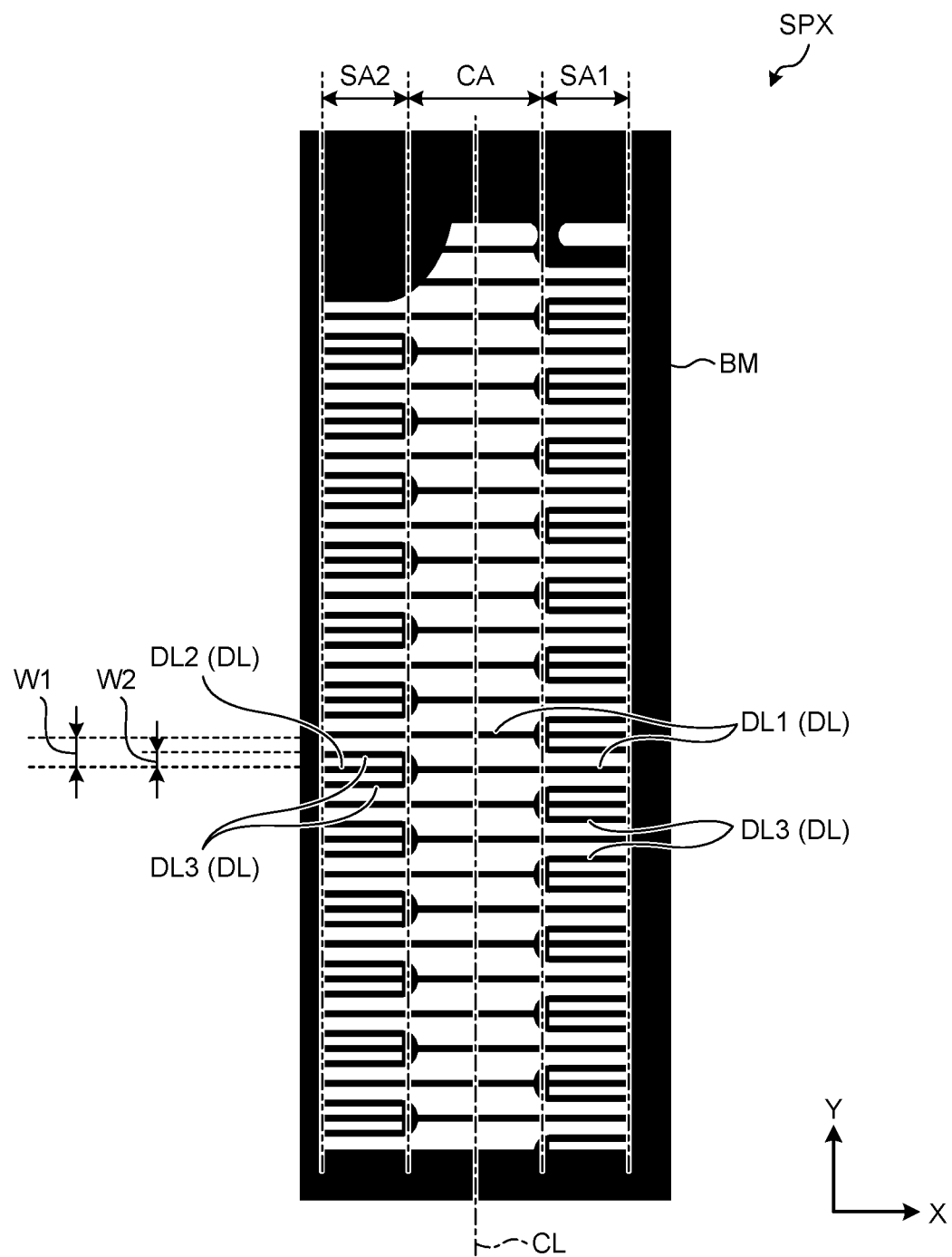
FIG. 8 is a plan view illustrating a transmission light image of a subpixel SPX when a voltage is applied.

FIG. 8 is a plan view illustrating a transmission light image of the subpixel SPX when a voltage is applied.

First line-shaped regions DL1 are formed at a first pitch W1 in a first region CA disposed in the central portion of the subpixel SPX in the X direction. Each of a second region SA1 positioned on a +X side of the first region CA and a third region SA2 positioned on a −X side of the first region CA is provided with the first line-shaped regions DL1, second line-shaped regions DL2, and third line-shaped regions DL3, at a second pitch W2 shorter than the first pitch W1. The portions in which the first line-shaped regions DL1 and the second line-shaped regions DL2 are formed are portions contributing to high-speed response. For this reason, the second region SA1 and the third region SA2 more greatly contribute to achievement of high-speed response than the first region CA.

The sizes of the second region SA1 and the third region SA2 are controlled according to the positions of the coupling portions 143 (see FIG. 7). The sizes of the second region SA1 and the third region SA2 increase as the positions of the coupling portions 143 become closer to the central line CL of the subpixel SPX. The sizes of the second region SA1 and the third region SA2 decrease as the positions of the coupling portions 143 become more distant from the central line CL of the subpixel SPX. Because the region contributing to high-speed response decreases as the sizes of the second region SA1 and the third region SA2 decrease, the response speed decreases, but display is brightened because the area occupied by the line-shaped regions DL is reduced. By contrast, because the region contributing to high-speed response increases as the sizes of the second region SA1 and the third region SA2 increase, the response speed increases, but display is darkened because the area occupied by the line-shaped regions DL increases. Accordingly, the positions of the coupling portions 143 are properly designed according to the required response speed and brightness property.

In the second region SA1 and the third region SA2, because the line-shaped regions DL are densely formed, orientation of the liquid crystal molecules more easily becomes unstable in comparison with the first region CA. For this reason, as illustrated in FIG. 6, the angle θ2 at which the second edge portion EG2 and the fourth edge portion EG4 cross is set larger than the angle θ1 at which the first edge portion EG1 and the third edge portion EG3 cross. This structure enables orientation of the liquid crystal molecules in the vicinity of the second edge portion EG2 to be stabilized more easily than orientation of the liquid crystal molecules in the vicinity of the first edge portion EG1, and contributes to stabilization of the whole orientation of the second region SA2 and the third region SA3.

As described above, in the liquid crystal display device 100 according to the present embodiment, the coupling portions 143 coupling the adjacent belt-like portions 142 are arranged to be distributed to one side and the other side of the central line CL with the central line CL of each subpixel SPX interposed therebetween. With the structure, no line-shaped regions DL are formed in positions on the belt-like portions 142 provided between the first coupling portions 143a disposed on one side of the central line CL and the second coupling portions 143b disposed on the other side of the central line CL. This structure enables bright display.

Second Embodiment

Figure 9:
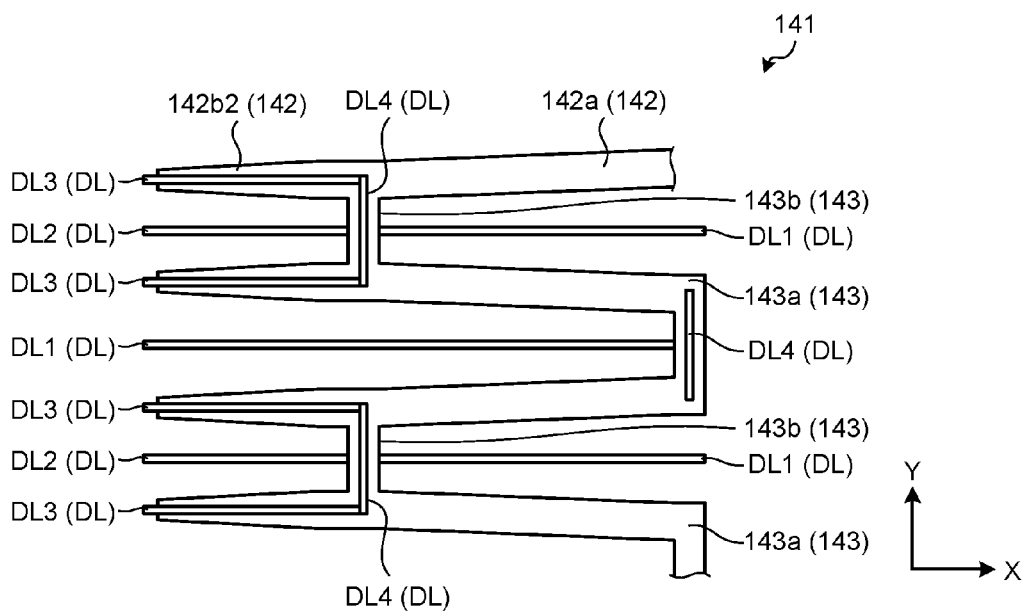
FIG. 9 is a plan view illustrating an electrode structure of a liquid crystal display device according to a second embodiment.

FIG. 9 is a plan view illustrating an electrode structure of a liquid crystal display device according to a second embodiment. In the present embodiment, constituent elements that are the same as those in the first embodiment are denoted by the same reference numerals, and detailed explanation thereof is omitted.

The present embodiment is different from the first embodiment in that the first coupling portions 143a couple end portions of two adjacent belt-like portions 142. Each of the belt-like portions 142 includes no first extension portion 142b1 illustrated in FIG. 6. In the structure, neither second line-shaped region DL2 nor third line-shaped region DL3 is formed on the +X side (side opposite to the central line side of the subpixel) of the first coupling portion 143a. This structure enables bright display, although the response speed deteriorates, in comparison with the first embodiment.

Third Embodiment

Figure 10:
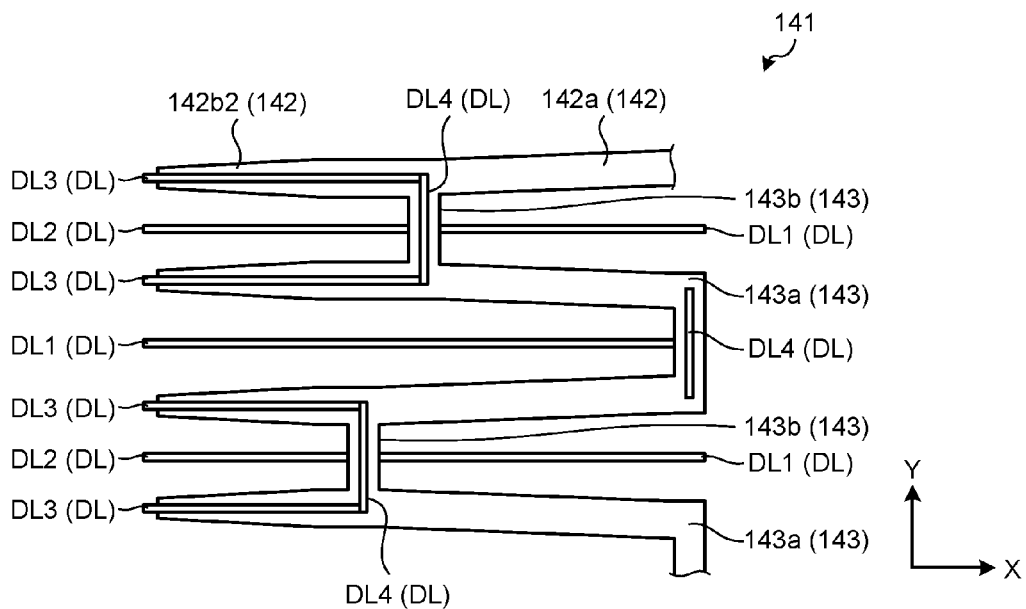
FIG. 10 is a plan view illustrating an electrode structure of a liquid crystal display device according to a third embodiment.

FIG. 10 is a plan view illustrating an electrode structure of a liquid crystal display device according to a third embodiment. In the present embodiment, constituent elements that are the same as those in the second embodiment are denoted by the same reference numerals, and detailed explanation thereof is omitted.

The present embodiment is different from the second embodiment in that the second coupling portions 143b include a plurality of second coupling portions 143b having mutually different positions in the X direction. The second coupling portions 143b are not arranged in a straight-line manner along the Y direction. With the structure, positions of some of the second coupling portions 143b arranged in the Y direction are shifted in the X direction, to enable minute adjustment of the brightness of display and the response speed.

Fourth Embodiment

Figure 11:
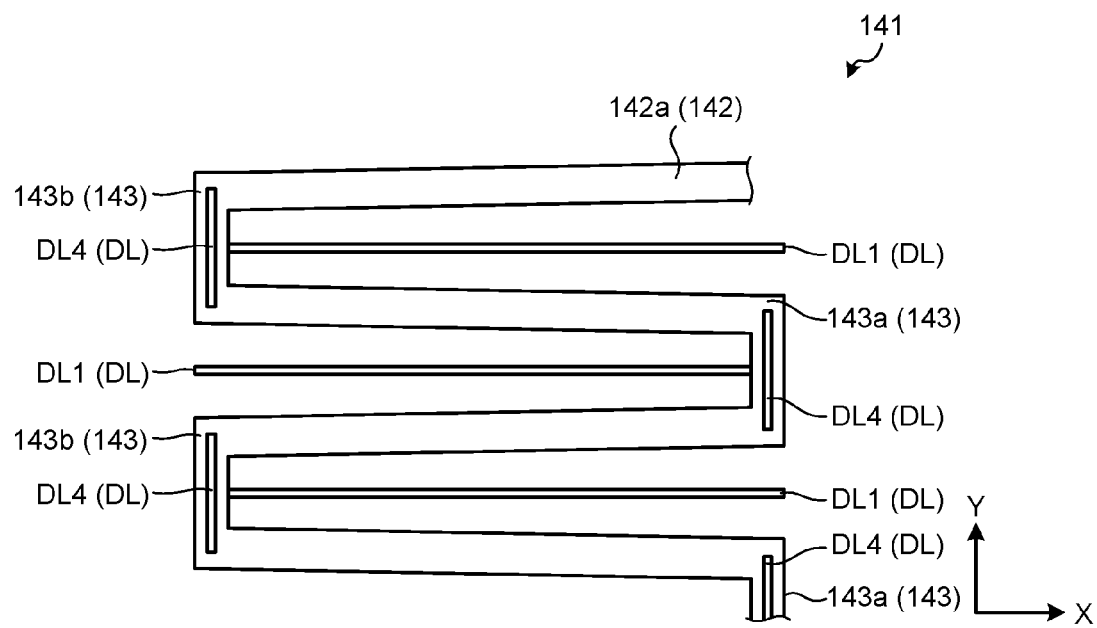
FIG. 11 is a plan view illustrating an electrode structure of a liquid crystal display device according to a fourth embodiment.

FIG. 11 is a plan view illustrating an electrode structure of a liquid crystal display device according to a fourth embodiment. In the present embodiment, constituent elements that are the same as those in the second embodiment are denoted by the same reference numerals, and detailed explanation thereof is omitted.

The present embodiment is different from the second embodiment in that each of the second coupling portions 143b couples end portions of two adjacent belt-like portions 142. Each of the belt-like portions 142 include neither the first extension portion 142b1 nor the second extension portion 142b2 illustrated in FIG. 6. With the structure, neither line-shaped region DL2 nor third line-shaped region DL3 is formed on the +X side (side opposite to the central line side of the subpixel) of the first coupling portion 143a and the −X side (side opposite to the central line side of the subpixel) of the second coupling portion 143b. This structure enables bright display, although the response speed deteriorates, in comparison with the second embodiment.

Fifth Embodiment

Figure 12:
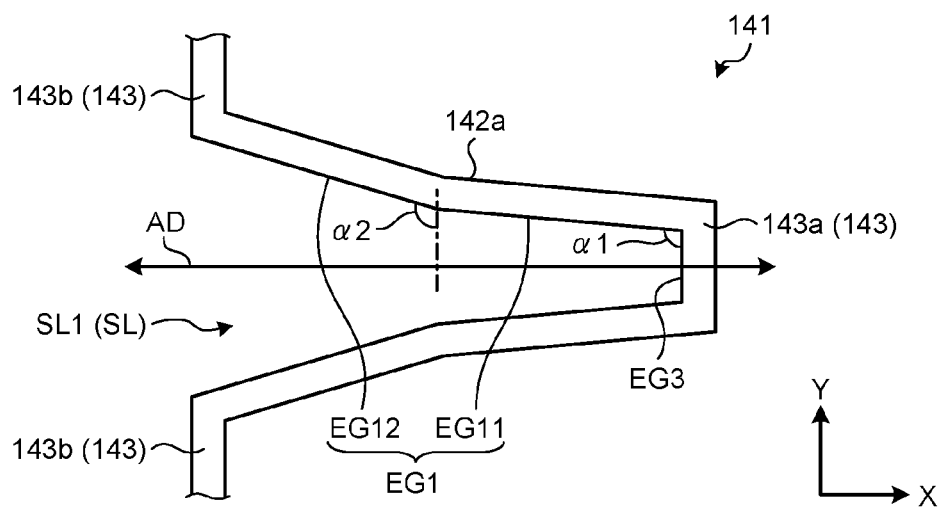
FIG. 12 is a plan view illustrating an electrode structure of a liquid crystal display device according to a fifth embodiment.

FIG. 12 is a plan view illustrating an electrode structure of a liquid crystal display device according to a fifth embodiment. In the present embodiment, constituent elements that are the same as those in the fourth embodiment are denoted by the same reference numerals, and detailed explanation thereof is omitted.

The present embodiment is different from the second embodiment in that each main line portion 142a is provided with a bent portion. An edge (first edge portion EG1) of each main line portion 142a includes a plurality of portions (first portion EG11 and second portion EG12) having mutually different inclination angles with respect to the third edge portion EG3. An inclination angle $\alpha 2$ of the second portion EG12 provided in a position distant from the coupling portion 143 is larger than an inclination angle $\alpha 1$ of the first portion EG11 provided in a position close to the coupling portion 143. This structure enables easy stabilization of orientation of the liquid crystal molecules in the position distant from the coupling portion 143.

Preferred embodiments of the present invention have been described above, but the present invention is not limited to the embodiments. The details disclosed in the embodiments are mere examples, but can be variously modified within a range not departing from the gist of the present invention. Proper modifications within the range not departing from the gist of the present invention also belong to the technical scope of the present invention, as a matter of course.

For example, the embodiments described above illustrate the structure in which each pixel electrode 141 is disposed on the liquid crystal layer 160 side of the common electrode 139 with the capacitive insulating film 140 interposed therebetween, and the pixel electrode 141 is provided with the belt-like portions 142 and the coupling portions 143, but the structure of the pixel electrodes 141 and the common electrode 139 is not limited thereto. For example, the common electrode 139 may be disposed on the liquid crystal layer 160 side of the pixel electrode 141 with the capacitive insulating film 140 interposed therebetween, and the common electrode 139 may be provided with the belt-like portions 142 and the coupling portions 143.

In addition, the embodiments described above illustrate the structure in which the pixel electrodes 141 and the common electrode 139 are stacked with the capacitive insulating film 140 interposed therebetween, but the structure of the pixel electrodes 141 and the common electrode 139 is not limited thereto. For example, the pixel electrodes 141 and the common electrode 139 may be formed adjacent to each other on the same layer.

In the embodiments described above, the first coupling portions 143a and the second coupling portions 143b are alternately arranged in the Y direction, but arrangement of the coupling portions 143 is not limited thereto. For example, some of the first coupling portions 143a may be arranged adjacent to each other in the Y direction. In the same manner, some of the second coupling portions 143b may be arranged adjacent to each other in the Y direction.

The layer structure of the first substrate 130 and the second substrate 150 is a mere example, and is not limited to the structure of the embodiments described above. For example, FIG. 5 illustrates the structure in which the color filters CF are provided on the second substrate 150, but the color filters CF may be provided on the first substrate 130. Specifically, the present invention may be applied to a color filter on array (COA) structure.

In the specification, the description disclosing that the members have an equal size means that the sizes of the members are equal to each other within a range of the manufacturing error. In the same manner, the description disclosing that the members are parallel or orthogonal to each other means that the members are parallel or orthogonal to each other within a range of the manufacturing error.

What is claimed is:

1. A liquid crystal display device comprising:
   a first substrate including a pixel electrode and a common electrode,
   a second substrate disposed opposite to the first substrate; and
   a liquid crystal layer disposed between the first substrate and the second substrate, the liquid crystal layer including first liquid crystal molecules and second liquid crystal molecules,
   wherein the pixel electrode or the common electrode includes, in a single sub-pixel having a first side area and a second side area that are divided by a central line of the single sub-pixel, the central line extending in a first direction,
      a plurality of belt-like portions arranged in the first direction, and
      a plurality of coupling portions that are configured to couple adjacent belt-like portions of the plurality of belt-like portions,
      wherein each of the plurality of belt-like portions continuously extends from the first side area to the second side area of the single sub-pixel in a second direction that transverses the first direction,
      wherein the plurality of coupling portions includes one or more first coupling portions provided in the first side area and one or more second coupling portions provided in the second side area,
      wherein a slit provided between two of the adjacent belt-like portions is divided by a corresponding coupling portion of the plurality of coupling portions into a first slit portion disposed closer to the central line than the corresponding coupling portion and a second slit portion disposed further away from the central line than the corresponding coupling portion,
      wherein an edge of a first belt-like portion of the two of the adjacent belt-like portions facing the slit includes a first edge portion facing the first slit portion and a second edge portion facing the second slit portion, and
   wherein the first liquid crystal molecules that are close to the first edge portion and the second liquid crystal molecules that are close to the second edge portion are rotated in mutually opposite directions with respect to a normal direction of the first substrate, when a voltage is applied between the pixel electrode and the common electrode.

2. The liquid crystal display device according to claim 1, wherein the liquid crystal layer includes liquid crystal molecules, and wherein, when the voltage is applied between the pixel electrode and the common electrode, the liquid crystal molecules that are close to edges opposite to each other of the two of the adjacent belt-like portions of the plurality of belt-like portions are rotated in mutually opposite directions with respect to the normal direction of the first substrate.

3. The liquid crystal display device according to claim 2, further comprising:
a first orientation film,
wherein the first substrate is provided with the first orientation film that orients the liquid crystal layer in the second direction.

4. The liquid crystal display device according to claim 1, wherein the one or more first coupling portions and the one or more second coupling portions are alternately arranged repeatedly in the first direction.

5. The liquid crystal display device according to claim 1, wherein
a space between the two of the adjacent belt-like portions of the plurality of belt-like portions varies along the second direction, and
the two of the adjacent belt-like portions are connected with the plurality of coupling portions at a portion at which the space between the two of the adjacent belt-like portions is smallest.

6. The liquid crystal display device according to claim 1, wherein, among the plurality of belt-like portions provided in the single sub-pixel, at least some of the plurality of belt-like portions provided in a central portion have a mutually equal length.

7. The liquid crystal display device according to claim 1, wherein
the liquid crystal layer includes liquid crystal molecules having positive dielectric anisotropy, and
an orientation direction of the liquid crystal molecules in an initial orientation state in which the voltage is not applied between the pixel electrode and the common electrode is the second direction.

8. The liquid crystal display device according to claim 1, wherein
the pixel electrode is disposed on a liquid crystal layer side of the common electrode with an insulating film interposed between the pixel electrode and the common electrode, and
the plurality of belt-like portions and the plurality of coupling portions are provided in the pixel electrode.

9. The liquid crystal display device according to claim 1, wherein
a first edge length of the first edge portion is different from a second edge length of the second edge portion.

10. The liquid crystal display device according to claim 1, wherein
a first slit length of the first slit portion in the second direction is different from a second slit length of the second slit portion in the second direction.

11. A liquid crystal display device comprising:
a first substrate including a pixel electrode and a common electrode,
a second substrate disposed opposite to the first substrate; and
a liquid crystal layer disposed between the first substrate and the second substrate,
wherein the pixel electrode or the common electrode includes, in a single sub-pixel having a first side area and a second side area that are divided by a central line of the single sub-pixel, the central line extending in a first direction,
a plurality of belt-like portions arranged in the first direction, and
a plurality of coupling portions that are configured to couple adjacent belt-like portions of the plurality of belt-like portions,
wherein each of the plurality of belt-like portions continuously extends from the first side area to the second side area of the single sub-pixel in a second direction that transverses the first direction,
wherein the plurality of coupling portions includes one or more first coupling portions provided in the first side area and one or more second coupling portions provided in the second side area,
wherein a slit provided between two of the adjacent belt-like portions is divided by a corresponding coupling portion of the plurality of coupling portions into a first slit portion disposed closer to the central line than the corresponding coupling portion and a second slit portion disposed further away from the central line than the corresponding coupling portion,
wherein an edge of a first belt-like portion of the two of the adjacent belt-like portions facing the slit includes a first edge portion facing the first slit portion and a second edge portion facing the second slit portion,
wherein the corresponding coupling portion includes a third edge portion facing the first slit portion and a fourth edge portion facing the second slit portion, and
wherein a first angle between the second edge portion and the fourth edge portion is larger than a second angle between the first edge portion and the third edge portion.

12. The liquid crystal display device according to claim 11, wherein
a first edge length of the first edge portion is different from a second edge length of the second edge portion.

13. The liquid crystal display device according to claim 11, wherein
a first slit length of the first slit portion in the second direction is different from a second slit length of the second slit portion in the second direction.

14. A liquid crystal display device comprising:
a first substrate including a pixel electrode and a common electrode,
a second substrate disposed opposite to the first substrate; and
a liquid crystal layer disposed between the first substrate and the second substrate,
wherein the pixel electrode or the common electrode includes, in a single sub-pixel having a first side area and a second side area that are divided by a central line of the single sub-pixel, the central line extending in a first direction,
a plurality of belt-like portions arranged in the first direction, and
a plurality of coupling portions that are configured to couple adjacent belt-like portions of the plurality of belt-like portions,
wherein each of the plurality of belt-like portions continuously extends from the first side area to the second side area of the single sub-pixel in a second direction that transverses the first direction,
wherein the plurality of coupling portions includes one or more first coupling portions provided in the first side area and one or more second coupling portions provided in the second side area, wherein a slit is provided between two of the adjacent belt-like portions coupled with a corresponding coupling portion of the plurality of coupling portions, wherein an edge of a first belt-like portion of the two of the adjacent belt-like portions faces the slit, wherein the corresponding coupling portion includes a coupling edge portion facing the slit, wherein the edge of the first belt-like portion includes a first portion and a second portion that have mutually different inclination angles with respect to the coupling edge portion, and wherein a first inclination angle of the second portion is larger than a second inclination angle of the first portion, a position of the second portion being farther from the corresponding coupling portion than a position of the first portion.

* * * * *